(12) United States Patent
Tang et al.

(10) Patent No.: US 12,457,881 B2
(45) Date of Patent: Oct. 28, 2025

(54) DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Pandeng Tang, Beijing (CN); Qian Wang, Beijing (CN); Yiyang Zhang, Beijing (CN); Yue Wei, Beijing (CN); Yuqing Yang, Beijing (CN); Xiping Li, Beijing (CN); Yang Zhou, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/577,995

(22) PCT Filed: Jan. 30, 2022

(86) PCT No.: PCT/CN2022/075180
§ 371 (c)(1),
(2) Date: Jan. 9, 2024

(87) PCT Pub. No.: WO2023/142111
PCT Pub. Date: Aug. 3, 2023

(65) Prior Publication Data
US 2024/0334776 A1 Oct. 3, 2024

(51) Int. Cl.
*H10K 59/40* (2023.01)
*G06F 3/041* (2006.01)
(Continued)

(52) U.S. Cl.
CPC ........... *H10K 59/40* (2023.02); *G06F 3/0412* (2013.01); *G06F 3/0445* (2019.05);
(Continued)

(58) Field of Classification Search
CPC ...... G06F 3/041–047; G06F 2203/041–04114; G06F 3/04164;
(Continued)

(56) References Cited

U.S. PATENT DOCUMENTS 11,901,375 B2* 2/2024 Ju ............................ H01L 24/03
2020/0168689 A1* 5/2020 Park ...................... G06F 3/0445
(Continued)

FOREIGN PATENT DOCUMENTS

CN 203773182 U 8/2014
CN 104733643 A 6/2015
(Continued)

OTHER PUBLICATIONS

CN-113421909-A (Year: 2021).*

*Primary Examiner* — Sanjiv D. Patel
(74) *Attorney, Agent, or Firm* — HOUTTEMAN LAW LLC

(57) ABSTRACT

The present disclosure provides a display panel and a display apparatus. The display panel includes: a substrate; and a touch structure located on a side, away from the substrate, of an organic light-emitting device and including a touch electrode and an insulating layer, a control chip connecting terminal is arranged in the bonding area at a position close to a bending area, the control chip connecting terminal is electrically connected with a gate driving circuit, a contact pad is arranged on a side, away from the bending area, of the control chip connecting terminal, the contact pad is configured to be capable of being bonded with a flexible printed circuit board, and at least part of the contact pad and at least part of the touch electrode are arranged in the same layer and made of the same material.

18 Claims, 7 Drawing Sheets

(51) Int. Cl.
*G06F 3/044* (2006.01)
*G09G 3/3266* (2016.01)
*H10K 59/122* (2023.01)
*H10K 59/131* (2023.01)
*H10K 59/80* (2023.01)
*H10K 59/88* (2023.01)

(52) U.S. Cl.
CPC ......... *G09G 3/3266* (2013.01); *H10K 59/122* (2023.02); *H10K 59/131* (2023.02); *H10K 59/873* (2023.02); *H10K 59/88* (2023.02)

(58) Field of Classification Search
CPC ..... G06F 3/0446; G06F 3/0412; H10K 59/40; H10K 59/131; G09G 2300/0426; H05K 1/028; H05K 2201/1012; H05K 1/189
See application file for complete search history.

(56) References Cited

U.S. PATENT DOCUMENTS

| | | | | |
|---|---|---|---|---|
| 2020/0310594 A1* | 10/2020 | Yang | ...................... | G06F 3/0444 |
| 2021/0125566 A1* | 4/2021 | Yang | ...................... | H10D 86/441 |
| 2021/0383730 A1* | 12/2021 | Kim | ...................... | G06F 1/1616 |

FOREIGN PATENT DOCUMENTS

| | | | | |
|---|---|---|---|---|
| CN | 108255338 | A | | 7/2018 |
| CN | 106952887 | B | | 2/2019 |
| CN | 111522468 | A | | 8/2020 |
| CN | 111599823 | A | | 8/2020 |
| CN | 113421909 | A | * | 9/2021 |
| JP | 2003317546 | A | | 11/2003 |

\* cited by examiner

DISPLAY PANEL AND DISPLAY APPARATUS

TECHNICAL FIELD

The present disclosure relates to the field of display technology, and particularly, to a display panel and a display apparatus.

BACKGROUND

The display screen and the system thereof play a crucial role in the aspects of providing timely information for human beings, improving the quality of life, enhancing user experience and the like as a human-computer interface interaction link, and the light-emitting devices such as the organic light-emitting diode and the like have the advantages of self-luminescence, wide visual angle, quick response, small volume, small mass, bendablility, flexibility and the like, so that the display screen and the system thereof are a great breakthrough in the field of display and improve the visual enjoyment and the on-site experience of human beings. However, the current display apparatus still needs to be improved: for example, a current display panel, especially having a touch structure, needs to be connected to an external circuit (e.g., a flexible printed circuit board) in a bonding area. Due to bonding of the display panel with the external circuit, there is often a problem that the yield of the display panels is decreased.

Accordingly, further improvements in the current display panel, method for manufacturing the display panel, and display apparatus are still desired.

SUMMARY

The present disclosure is directed to alleviating or solving at least one of the above-mentioned problems at least to some extent.

In view of this, in a first aspect of the present disclosure, a display panel is provided. The display panel includes: a substrate having a display area and a peripheral area located on at least one side of the display area; a bonding area located on a side of the display area and in the peripheral area, and a bending area is arranged between the display area and the bonding area; a gate driving circuit, which is at least partially located in the peripheral area and is configured to provide a gate driving signal for a light-emitting device in the display area; a touch structure located on a side of the light-emitting device away from the substrate, the touch structure including a touch electrode and an insulating layer, a control chip connecting terminal is arranged in a portion of the bonding area close to the bending area, the control chip connecting terminal being electrically connected with the gate driving circuit, a contact pad is arranged on a side of the control chip connecting terminal away from the bending area, and at least a portion of the contact pad and at least a portion of the touch electrode are arranged in a same layer and made of a same material.

In some implementations, on a plane parallel to the substrate, a dummy contact pad is further provided on at least one side of the contact pad, and the dummy contact pad and at least a portion of the touch electrode being provided in a same layer and made of a same material.

In some implementations, a gate metal layer, a gate insulating layer, a source-drain metal layer and a planarization layer are sequentially stacked on the substrate, the light-emitting device is located on a side of the planarization layer away from the substrate, a partial structure of the contact pad is formed by at least one of the gate metal layer or the source-drain metal layer.

In some implementations, the contact pad includes a first contact pad and a second contact pad, the first contact pad being arranged close to the substrate, the second contact pad being located at a side of the first contact pad away from the substrate, and an orthographic projection of the first contact pad on the substrate and an orthographic projection of the second contact pad on the substrate being at least partially overlapped, the first contact pad being formed by at least one of the gate metal layer or the source-drain metal layer, and the second contact pad and at least a portion of the touch electrode being arranged in a same layer and made of a same material.

In some implementations, the second contact pad covers at least an edge of the first contact pad, and the second contact pad has a border region at a portion thereof away from the first contact pad, an orthographic projection of the border region on the substrate and an orthographic projection of the first contact pad on the substrate are not overlapped, the first contact pad and the border region having a segment difference of not less than 0.5 μm therebetween.

In some implementations, the insulating layer is at least partially located in the bonding area and covers a partial area of the bonding area, and an orthographic projection of the insulating layer on the substrate and at least an orthographic projection of the first contact pad on the substrate are not overlapped.

In some implementations, the planarization layer is partially located in the bonding area, the planarization layer has a first opening at the contact pad to expose the contact pad, the insulating layer covers the planarization layer, and the insulating layer has a second opening at least partially exposing the first opening.

In some implementations, a buffer layer, a gate insulating layer, and an interlayer insulating layer, which are sequentially stacked, are provided in the bonding area, the first contact pad being located on a side of the interlayer insulating layer away from the substrate, the planarization layer being located on the side of the interlayer insulating layer away from the substrate, and an orthographic projection of the planarization layer on the substrate and at least an orthographic projection of the second contact pad on the substrate being overlapped, and the insulating layer is in contact with the interlayer insulating layer in at least a portion of the border region.

In some implementations, the insulating layer includes at least one of a touch buffer sub-layer or a touch insulating sub-layer, the touch electrode includes a first electrode layer and a second electrode layer, and the touch structure includes the touch buffer sub-layer, the first electrode layer, the touch insulating sub-layer and the second electrode layer arranged in sequence, and the touch buffer sub-layer is located on a side close to the light-emitting device.

In some implementations, a dummy contact pad is provided on at least one side of the contact pad, and an alignment mark is provided between the dummy contact pad and the contact pad, orthographic projections of the touch buffer sub-layer, the touch insulating sub-layer on the substrate and orthographic projections of the contact pad, the dummy contact pad, and the alignment mark on the substrate are not overlapped.

In some implementations, at least one of the touch buffer sub-layer or the touch insulating sub-layer covers an edge portion of the contact pad.

In some implementations, the second contact pad has an annular structure located on a side of the insulating layer away from the substrate.

In some implementations, an outer periphery of the annular structure having a shape corresponding to that of the first contact pad. Therefore, the pressure can be effectively released, and the pressing of conductive particles on the inorganic film layer is reduced.

In some implementations, the dummy contact pad has at least a first portion, the first portion being located on a side of the contact pad, the first portion including a plurality of metal bars.

In some implementations, at least a portion of a plurality of contact pads constitute a first row of contact pads, the first row of contact pads and the first portion are arranged in a row along a first direction, first contact pads of the first row of contact pads and the metal bars each extend along a second direction, and the second direction and the first direction forms an included angle therebetween.

In some implementations, the display panel includes: a dummy contact pad located on at least one side of the contact pad; an alignment mark located between the dummy contact pad and the contact pad; a third contact pad located on a side of the alignment mark away from the substrate, an orthographic projection of the third contact pad on the substrate and an orthographic projection of the alignment mark on the substrate being overlapped; the dummy contact pad includes a first portion and a second portion, the first portion including a plurality of metal bars, the metal bars and the first contact pad being arranged in a row along a first direction, and the metal bars and the first contact pad each extending along a second direction, the alignment mark being located between the first portion and the first contact pad, the first contact pad having a length longer than that of the alignment mark in the second direction, and the second portion being located between the first portion and the first contact pad, and the second portion and the alignment mark being arranged along the second direction, the second contact pad, the third contact pad and the dummy contact pad are all arranged in the same layer and made of the same material as at least a portion of the touch electrode.

In some implementations, the display panel includes: a first substrate; a second substrate disposed at a side of the first substrate; a first barrier layer located between the first substrate and the second substrate; a second barrier layer located on a side, away from the first barrier layer, of the second substrate; a backplane circuit structure including an active layer, a first gate insulating layer, a gate metal layer, a second gate insulating layer, a source-drain metal layer, a passivation layer, a second source-drain metal layer and a planarization layer, the backplane circuit structure forming a thin film transistor and a capacitor in the gate driving circuit, and at least a portion of an orthographic projection of the planarization layer on the first substrate is located in the bonding area; a pixel defining structure located on a side of the backplane circuit structure away from the first substrate and separates a plurality of opening areas used for accommodating organic light-emitting devices in the display area; an encapsulation structure including a plurality of inorganic sub-layers and organic sub-layers stacked, the encapsulation structure being located on a side of the pixel defining structure away from the first substrate and encapsulating the organic light-emitting devices onto the substrate; the touch structure includes a touch buffer sub-layer, a first electrode layer, a touch insulating sub-layer and a second electrode layer which are sequentially arranged, and the touch structure is located on a side, away from the organic light-emitting device, of the encapsulating structure; a dummy contact pad is further provided on at least one side of the contact pad, an alignment mark is arranged between the dummy contact pad and the contact pad, a third contact pad is provided at a side of the alignment mark away from the substrate, an orthographic projection of the third contact pad on the substrate and an orthographic projection of the alignment mark on the substrate are overlapped, the contact pad includes a first contact pad and a second contact pad, the first contact pad is arranged close to the substrate, and the second contact pad, the third contact pad and the dummy contact pad are all arranged in the same layer and made of the same material as the second electrode layer, the bonding area has a plurality of predetermined regions including a first region, a second region and a third region, the contact pad is located in the third region, the alignment mark is located in the second region, and the dummy contact pad is located in the first region.

In some implementations, orthographic projections of the planarization layer, the touch buffer sub-layer, and the touch insulating sub-layer on the first substrate at least partially cover the first region, the second region, and the third region and cover an edge of the first contact pad; the dummy contact pad in the first region is located on a side of the touch insulating sub-layer away from the substrate; the second region is provided therein with the third contact pad corresponding to the alignment mark, and the third contact pad is located on a side, away from the first substrate, of the touch insulating sub-layer; and the third region is provided therein with a second contact pad on a side of the touch insulating sub-layer away from the first substrate, and an orthographic projection of the second contact pad on the substrate covers an orthographic projection of the first contact pad on the substrate.

In some implementations, an orthographic projection of the planarization layer on the first substrate and the first region are not overlapped, and the first region is provided therein with the touch buffer sub-layer and the touch insulating sub-layer; the planarization layer covers an edge of the alignment mark and an edge of the first contact pad, and the touch buffer sub-layer and the touch insulating sub-layer are provided on a side of the planarization layer away from the first substrate in the second region and the third region, the third contact pad and the second contact pad both cover a partial region of the touch insulating sub-layer.

In some implementations, the contact pad includes a lead connection portion and a conductor portion electrically connected, a surface of the conductor portion at a side away from the substrate being exposed, the lead connection portion and the conductor part are both formed by a source-drain metal layer, or the lead connection portion is formed by a gate metal layer, the conductor portion is formed by a source-drain metal layer, an insulating structure is arranged between the lead connection portion and the conductor portion, and the lead connection portion and the conductor portion are electrically connected through a via hole penetrating through the insulating structure.

In a second aspect of the present disclosure, the present disclosure provides a display apparatus. The display apparatus includes the display panel described above. Therefore, the display apparatus has all the features and advantages of the display panel described above, and the description thereof is omitted. Generally speaking, the display apparatus has at least the advantage of higher product yield.

BRIEF DESCRIPTION OF DRAWINGS

The above and/or additional aspects and advantages of the present disclosure will become apparent and readily appreciated from the following description of the embodiments, taken in conjunction with the accompanying drawings of which.

DETAIL DESCRIPTION OF EMBODIMENTS

Figure 1:
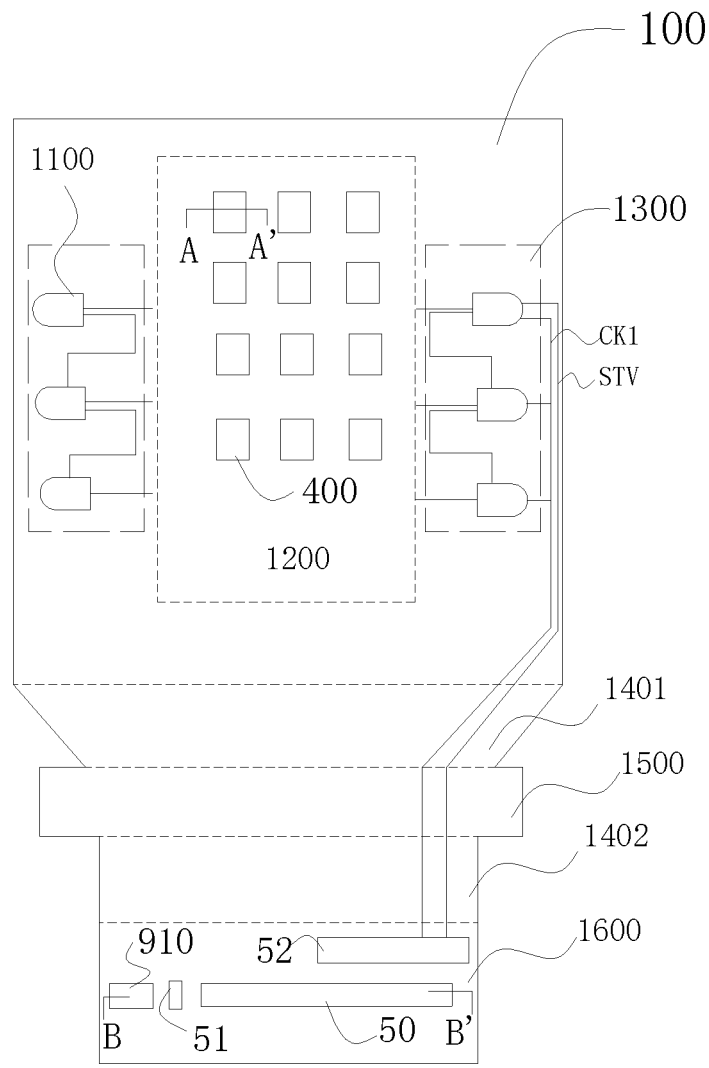
FIG. 1 shows a schematic structural diagram of a display panel according to an embodiment of the present disclosure.

The following will provide a detailed description of the embodiments of the present disclosure, examples of which are illustrated in the accompanying drawings, like reference numerals in the drawings refer to the same or similar elements or elements having the same or similar functions throughout. The embodiments described below with reference to the accompanying drawings are illustrative only for the purpose of explaining the present disclosure, and are not to be construed as limiting the present disclosure.

In an aspect of the present disclosure, referring to FIG. 1, a display panel is proposed. The display panel 1000 includes a substrate 100 having a display area 1200 and a peripheral area 1300, the peripheral area being located on at least one side of the display area. A bonding area 1600 is located in the peripheral area at a side of the display area 1200, and a bending area 1500 is disposed between the display area and the bonding area, so that the display panel can be bent at the bending area. A gate driving circuit 1100 is at least partially located in the peripheral area 1300 and is configured to provide a gate driving signal to a light-emitting device (not shown) located in the display area 1200. The display panel may further include a first fan-out area 1401 and a second fan-out area 1402, so that signal wires in the display area may be fanned out to a side of the bonding area along the fan-out area. A control chip connecting terminal 52 is provided in a portion of the bonding area close to the bending area 1500, and the control chip connecting terminal 52 is electrically connected to the gate driving circuit 1100. In some implementations, a contact pad 50 is provided on a side of the control chip connecting terminal 52 away from the bending area 1500, and the contact pad 50 is configured to be bondable with a flexible printed circuit board.

Figure 15:
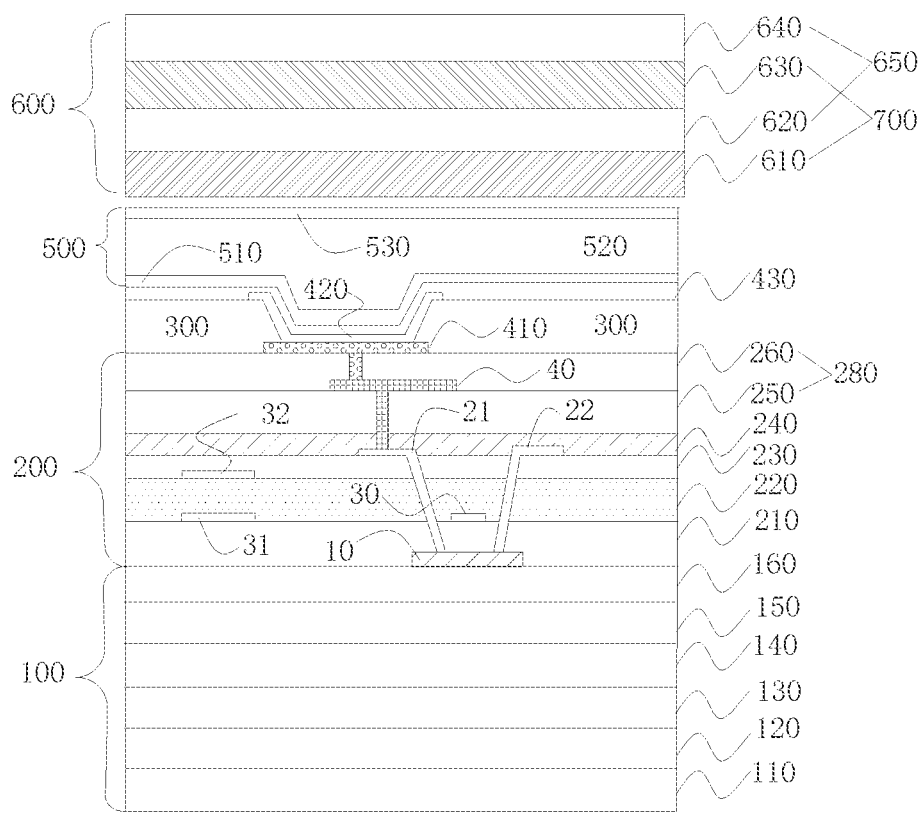
FIG. 15 shows a schematic diagram illustrating a partial structure of a display panel according to an embodiment of the present disclosure.

Referring to FIG. 15 (which is a schematic cross-sectional view taken along line AA' of FIG. 1), a touch structure 600 is located on a side of the light-emitting device 400 away from the substrate 100, and a plurality of light-emitting devices 400 (each including at least an anode 410) on the substrate 100 may be spaced apart from each other by a pixel defining layer 300. The touch structure 600 includes a touch electrode 650 and an insulating layer 700, the touch electrode 650 includes a first electrode layer 620 and a second electrode layer 640, and the insulating layer 700 may include at least one of a touch buffer sub-layer 610 and a touch insulating sub-layer 630, so that the touch structure 600 may include the touch buffer sub-layer 610, the first electrode layer 620, the touch insulating sub-layer 630 and the second electrode layer 640 sequentially disposed, and the touch buffer sub-layer 610 is disposed at a side close to the light-emitting device. At least a portion of the contact pad 50 and a portion of the touch electrode 650 are disposed in a same layer and made of a same material. That is, at least a portion of the contact pad 50 and the touch electrode 650 are disposed in the same layer and made of the same material. In a case where the touch electrode 650 includes a plurality of electrode layers, the contact pad 50 and at least one of the electrode layers may be disposed in the same layer and made of the same material.

It should be noted that, at least a portion of the contact pad 50 and the touch electrode 650 are disposed in the same layer and made of the same material, which means that they are film layers on a same structural layer, or at least a portion of the contact pad 50 and the touch electrode 650 are film layers in the same layer, and may be a layer structure formed by following steps: forming a film layer with a specific pattern by a single film forming process, and then patterning the film layer by a single patterning process using a same mask plate. Depending on the specific pattern, the single patterning process may include multiple times of exposure, development, or etching, and the specific pattern may be continuous or discontinuous, and the specific pattern may be at different heights or have different thicknesses.

For ease of understanding, the following first briefly explains the principle that the display panel can achieve the above beneficial effects.

Figure 2:
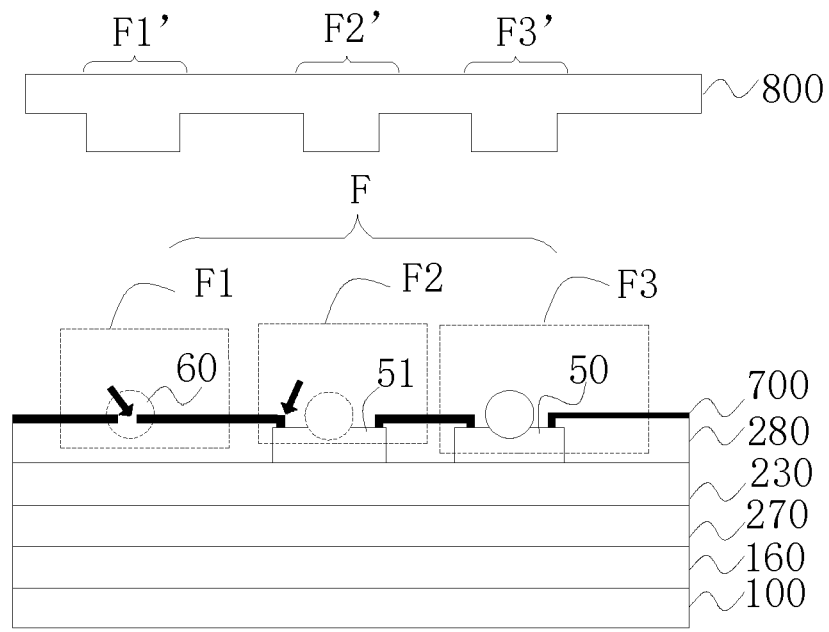
FIG. 2 shows a schematic structural diagram of a bonding area of a display panel in the related art.

As mentioned above, the current display panel always needs to be connected to an external circuit such as a flexible printed circuit board 800 at the bonding area 1600. FIGS. 2 to 10 each are a partial cross-sectional view of the contact pad 50 (which is a cross-sectional diagram taken along a line BB' of FIG. 1). Referring to FIG. 2, during a bonding process, because the segment difference (height difference) in the bonding area is small, conductive particles 60 at positions of the contact pad 50 and the like are stressed greatly to break inorganic film layers such as an insulating layer 700 and even damage organic film layers such as the planarization layer 280, so as to form a moisture-oxygen path, and moisture may invade the planarization layer 280 from the broken point (in a direction shown by the arrow in the FIG. 2), resulting in the fact that the organic film layers such as the planarization layer 280 fall off, which seriously affects the product yield. The display panel provided by the present disclosure can alleviate the above problem to some extent or even solve it. With the contact pad, a portion of which and the touch electrode are provided in the same layer and made of the same material, the release of bonding stress at the contact pad can be improved, so that the above mentioned defect that the inorganic film layer is broken to form the moisture-oxygen path and then the organic film layers are caused to be fallen off can be alleviated or even avoided.

In some implementations, the display panel can also alleviate or even avoid the above defect that the inorganic film layer is broken to form the moisture-oxygen path and then the organic film layers are caused to be fallen off by satisfying at least one of the following conditions.

Figure 3:
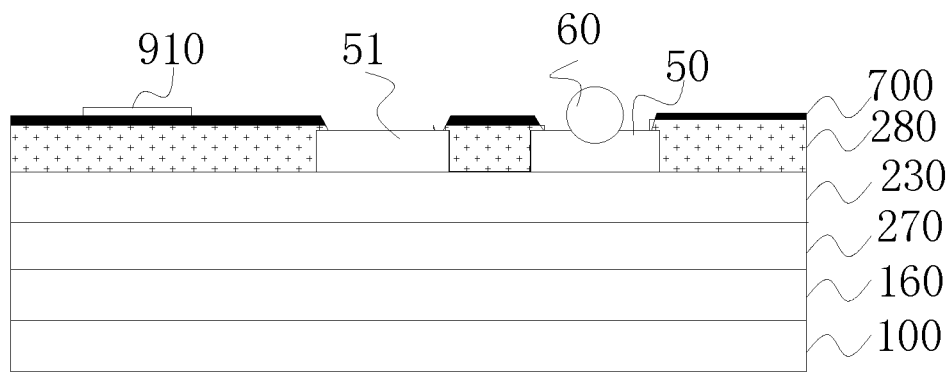
FIG. 3 shows a schematic structural diagram of a bonding area of a display panel according to an embodiment of the present disclosure.

In a first aspect, referring to FIG. 3, an orthographic projection of the insulating layer 700 on the substrate 100 and an orthographic projection of the contact pad 50 on the substrate 100 are not overlapped. Thereby, it is possible to alleviate or even prevent damage to the peripheral area, particularly to the insulating layer, due to the bonding pressure during connecting the contact pad 50 to the external circuit.

In a second aspect, referring to FIG. 3, a dummy contact pad 910 may be provided in the bonding area. The dummy contact pad 910 may be made of a material for forming the touch electrode, i.e., the dummy contact pad and at least a portion of the touch electrode are disposed in the same layer and made of the same material. In a plane parallel to the substrate, the dummy contact pad 910 may be located on at least one side of the contact pad. Therefore, the dummy contact pad can enable the conductive particles and positions around the bonding position to form a certain segment difference therebetween during bonding, so that film layer falling and test failure caused by breakage of the film layer and moisture absorption of the structures such as the planarization layer 280 can be alleviated or even solved, and the product yield is improved.

In a third aspect, the segment difference between the position of the contact pad and a region except the position of the contact pad in the bonding area may be not less than 0.5 μm. Specifically, the segment difference of the position of the contact pad and the region except the position of the contact pad in the bonding area may be made not less than 0.5 μm by means of a method including, but not limited to, removing a part of the structure (such as the planarization layer) of the bonding area. Therefore, a certain height difference can be formed in the bonding area, and the inorganic film layer is prevented from being broken due to the fact that the pressure at the conductive particles for bonding is too large in a case where the height difference is too small.

In some implementations, the above three solutions are all beneficial to relieving the risk of breaking the inorganic film layer at the bonding area. In some implementations, the display panel may satisfy one or more of the above three solutions, for example, the orthographic projection of the insulating layer 700 on the substrate 100 and the orthographic projection of the contact pad 50 on the substrate 100 may be not overlapped, while the dummy contact pad 910 is provided, and the contact pad and the region therearound have a segment difference more than 0.5 μm therebetween by a method including, but not limited to, removing a part of a structure such as the planarization layer in the bonding area.

Figure 4:
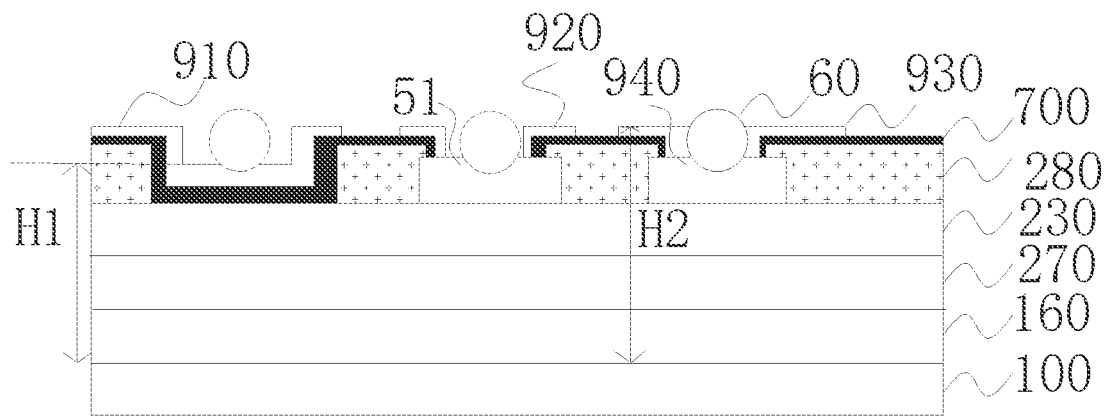
FIG. 4 shows a schematic structural diagram of a bonding area of a display panel according to an embodiment of the present disclosure.

In some implementations, a gate metal layer, a gate insulating layer, a source-drain metal layer, and a planarization layer are sequentially stacked on the substrate. Referring to FIG. 15, the light-emitting device 400 is positioned on a side of the planarization layer 280 away from the substrate 100. A portion of the contact pad may be formed of at least one of the gate metal layer or the source-drain metal layer. Referring to FIGS. 3 and 4, the planarization layer 280 may have a first opening at the contact pad 50 to expose the contact pad 50, the insulating layer 700 covers the planarization layer 280, and the insulation layer 700 has a second opening at least partially exposing the first opening, so that the conductive particle 60 may be electrically connected to the contact pad 50.

According to some implementations of the present disclosure, referring to FIGS. 4 to 8, the contact pad 50 may include a first contact pad 940 and a second contact pad 930. The first contact pad 940 is located close to the substrate 100 and the second contact pad 930 is located at a side of the first contact pad 940 away from the substrate 100 and an orthographic projection of the second contact pads 930 on the substrate 100 at least partially overlaps with an orthographic projection of the first contact pads 940 on the substrate 100. For example, the second contact pad 930 may cover at least an edge of the first contact pad 940. The first contact pad 940 may be formed of at least one of the gate metal layer or the source-drain metal layer, and the second contact pad 930 and at least a portion of the touch electrode may be formed in a same layer and made of a same material. For example, according to some implementations of the present disclosure, the second contact pad 930 may have an annular structure on a side of the insulating layer 700 away from the substrate 100, an outer periphery of the annular structure having a shape consistent with that of the first contact pad 940. Therefore, the first contact pad 940 may be formed by a metal layer located relatively close to the substrate 100, and then the second contact pad 930 may be formed by a metal layer (the touch electrode) located relatively away from the substrate 100, so as to finally realize the bonding with the flexible printed circuit board. The second contact pad 930 may thus act as a buffer, reducing the pressure at the bonding position.

Referring to FIGS. 1 and 3, a dummy contact pad 910 may be further provided on at least one side of the contact pad 50. An alignment mark 51 may be provided between the dummy contact pad 910 and the contact pad 50. The alignment mark 51 may be a metal mark for aligning with the flexible printed circuit board during bonding with the flexible printed circuit board. For example, referring to FIG. 3, the alignment mark 51 may be aligned with a protrusion in a F2' region on the flexible printed circuit board 800, so that the contact pad 50 may be bonded to a protrusion in a F3' region of the flexible printed circuit board 800. In addition, the flexible printed circuit board 800 may also have a protrusion located, for example, in a F1' region in FIG. 2 for a function such as alignment. The dummy contact pad 910 and at least a portion of the touch electrode may be disposed in the same layer and made of the same material. That is, the dummy contact pad 910 and the second contact pad 930 described above may be provided in the same layer and made of the same material. Thus, the dummy contact pad 910 can be used to further protect the contact pad and alleviate the bonding pressure on the contact pad and the periphery of the alignment mark. It will be understood by those skilled in the art that the "protrusion" of the flexible printed circuit board 800 is not intended to limit the present disclosure, but is merely provided as an example to facilitate understanding of the present disclosure.

In some implementations of the present disclosure, referring to FIG. 4, the second contact pad 930 has a border region at a portion thereof away from the first contact pad 940, and an orthographic projection of the border region on the substrate 100 and the orthographic projection of the first contact pad 940 on the substrate are not overlapped. The first contact pad 940 and the border region have a segment difference not less than 0.5 μm. Therefore, the bonding pressure can be effectively released, the film falling and test failure caused by the breakage of the inorganic film can be alleviated and even solved, and the product yield is improved. For example, the aforementioned border region may be a region on the periphery of the second contact pad 930.

In another implementation, the border region may be specifically at the dummy contact pad 910. Specifically, the first contact pad 940 may be located on a side of an interlayer insulating layer 230 away from the substrate 100, the planarization layer 280 may be located on a side of the interlayer insulating layer 230 away from the substrate 100, and an orthographic projection of the planarization layer 280 on the substrate 100 may at least overlap with an orthographic projection of the second contact pad 930 on the substrate 100, and the insulating layer 700 and the interlayer insulating layer 230 are in contact, and a contact region therebetween may be at least a portion of border region described above.

In a possible implementation, when the flexible printed circuit board is bonded with the contact pad, it is necessary to arrange conductive particles 60 in the region where the contact pad is located to electrically connect the flexible printed circuit board 800 with the contact pad, so that there is a relatively large segment difference between a position with the contact pad and a position without the contact pad in the bonding area 1600, thereby preventing the inorganic layer around the contact pad and the like from being damaged due to too large pressure of the contact pad caused by the too small segment difference by providing the conductive particle 60. Specifically, the segment difference may be formed by removing at least a portion of the planarization layer located at the bonding area. Since the planarization layer is mostly formed by an organic material and has a relatively large thickness, a relatively large segment difference can be formed between the bonding area and the display area by removing the at least a portion of the planarization layer. Specifically, the segment difference may be not less than 0.5 μm.

Figure 6:
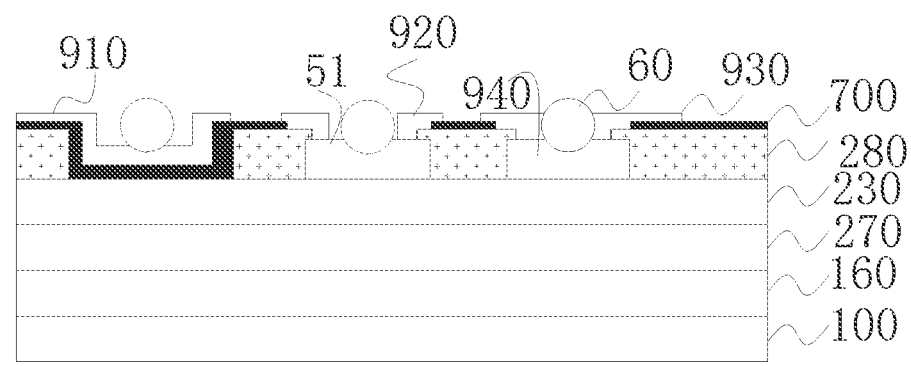
FIG. 6 shows a schematic diagram illustrating a partial structure of a display panel according to an embodiment of the present disclosure.

According to some implementations of the present disclosure, referring to FIG. 6, an orthographic projection of the insulating layer 700 on the substrate 100 and an orthographic projection of the first contact pad 940 on the substrate may at least not overlapped. According to some implementations of the present disclosure, the orthographic projection of the the insulating layer 700 on the substrate 100 and the orthographic projection of the contact pad (the first contact pad 940 and the second contact pad 930) on the substrate 100 may not overlapped (which is not shown in the figure). Therefore, the insulating layer can be prevented from being formed as a continuous film layer between the bonding area 1600 and the display area 1300, and thus the problem of falling off, defects and the like of the organic layer such as the planarization layer 280 below the insulating layer caused by moisture absorption due to partial breakage of the insulating layer can be alleviated or even avoided.

Figure 7:
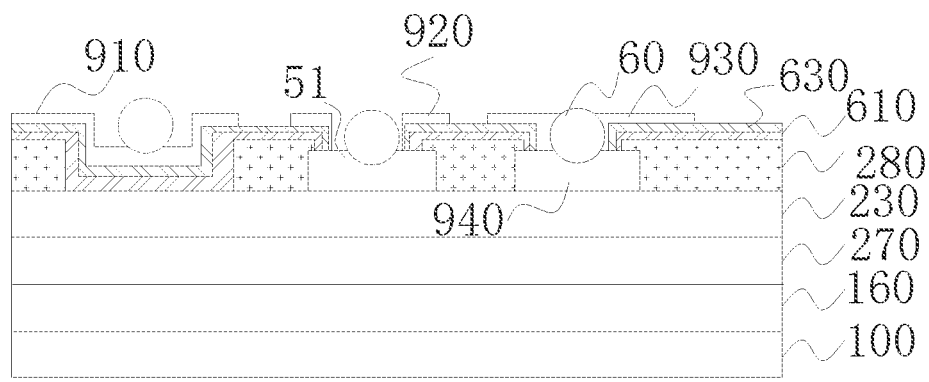
FIG. 7 shows a schematic diagram illustrating a partial structure of a display panel according to an embodiment of the present disclosure.
Figure 8:
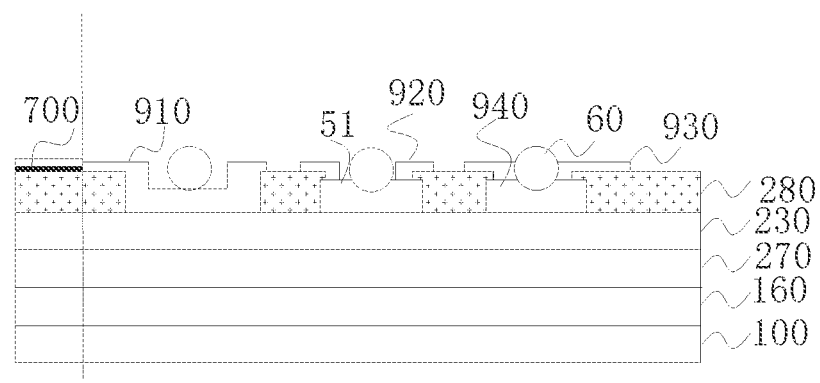
FIG. 8 shows a schematic diagram illustrating a partial structure of a display panel according to an embodiment of the present disclosure.

According to some implementations of the present disclosure, in addition to the position where the contact pad is located, the insulating layer 700 in a part or all of the bonding area may also be removed. For example, all the insulating layer within a predetermined region F as shown in FIG. 7 may be removed so that the orthographic projection of the insulating layer 700 on the substrate 100 and the predetermined region are not overlapped. The predetermined region F includes the aforementioned structures such as the contact pad, the dummy contact pad, and the alignment mark, and is used for realizing alignment and bonding with the flexible printed circuit board. Although the insulating layer 700 may play a role of blocking moisture and oxygen and protecting underlying metal (such as the contact pad) when formed of the inorganic material, the inventor found that the metal structure in the bonding area (such as the contact pad) is less prone to problems such as Ag particle precipitation compared to the metal structures in other positions (such as the display area), and thus, in order to prevent the insulating layer 700 in the bonding area from being broken during bonding, a portion or the entire insulating layer 700 in the bonding area may be removed without affecting the bonding function of the bonding area.

According to some implementations of the present disclosure, in addition to the foregoing structures, the bonding area may further include various other contact pads and connection terminals, for example, array test contact pads for performing an array test during manufacturing a display panel. The array test contact pads may be electrically connected to a plurality of sub-pixels in the display area. For example, at least one of the array test contact pads may be connected to a sub-pixel in the display area by a lead in the bonding area, for example, connected to a multiplexing circuit by the lead, to be connected to a plurality of data lines in the display area via the multiplexing circuit, thereby achieving an electrical connection with the sub-pixel and achieving a test function.

Specific corresponding requirements for the predetermined region F and the flexible printed circuit board are not particularly limited, and those skilled in the art can flexibly select as desired. The structure in the predetermined region F will be described in detail below. In some implementations, the flexible printed circuit board has protrusions, i.e., an F1' region, an F2' region, and an F3' region, and the predetermined region F corresponds to the protrusions of the flexible printed circuit board 800, so as to achieve the functions of bonding and alignment. Referring again to FIG. 2, the predetermined region F may include a first region F1, a second region F2, and a third region F3. The flexible printed circuit board 800 may have a plurality of protrusions at a side facing the display panel. The first region F1, the second region F2, and the third region F3 are regions of the display panel corresponding to the protrusions of the flexible printed circuit board. The third region F3 is a region corresponding to the contact pad 50 and the protrusion in the flexible printed circuit board. The display panel according to the embodiment of the present disclosure may further include an alignment mark 51 disposed in the same layer as the contact pad 50. The alignment mark 51 may be formed of the same material as the contact pad. The alignment mark 51 may be a metal mark for aligning with the flexible printed circuit board 800 during bonding with the flexible printed circuit board. Referring to FIG. 2, the alignment mark 51 may correspond to the protrusion in the F2' region at a side of the flexible printed circuit board 800 so as to achieve alignment, so that the contact pad 50 may be bonded to the protrusion of the flexible printed circuit board 800 in the F3' region. In addition, the flexible circuit board 800 may also have a protrusion located, for example, in the F1' region in FIG. 2 for a function such as alignment.

Figure 5:
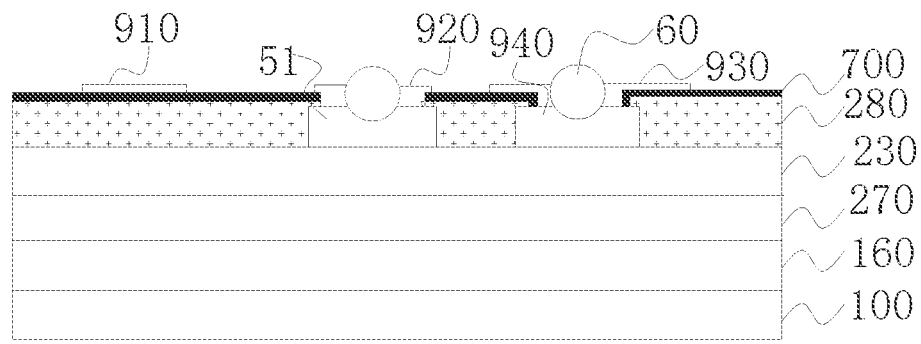
FIG. 5 shows a schematic structural diagram of a bonding area of a display panel according to an embodiment of the present disclosure.

Specifically, according to some implementations of the present disclosure, referring to FIG. 3 again, the orthographic projections of the planarization layer 280 and the insulating layer 700 on the first substrate 100 all extend to the first region, the second region and the third region, and the planarization layer 280 and the insulating layer 700 have hollow-out portions at exposed surfaces of the contact pad on a side away from the substrate 100. The dummy contact pad 910 corresponding to the protrusion of the flexible printed circuit board 800 may be disposed in the first region, so that the protrusion at the position may be buffered during the bonding process, and the insulating layer 700 may be prevented from being broken due to direct contact of the protrusion of the flexible printed circuit board with the insulating layer. The planarization layer 280 may cover an edge of the alignment mark 51 in the second region and an edge of the contact pad 50 in the third region, so that the alignment mark 51 and the contact pad 50 may be "edge-covered" by the planarization layer 280, thereby better protecting the alignment mark 51 and the contact pad 50. As shown in FIGS. 4 and 5, the so-called "edge-covering" processing means that the planarization layer covers the edges of the metal layers such as the alignment mark 51 and the contact pad 50 (i.e., the edges of the metal layers such as the alignment mark 51 and the contact pad 50 at the junction with the planarization layer), so that the planarization layer 280 covers the edges of the metal structures such as the alignment mark 51 and the contact pad 50.

Referring again to FIG. 4, the orthographic projection of the planarization layer 280 on the substrate may not overlap the first region, i.e., there may be no planarization layer in the first region, so that a large segment difference may be formed between the first region and the contact pad. The first region may also be provided with the dummy contact pad 910, which is disposed in the same layer as the touch electrode and made of the same material as the touch electrode. The second region may be provided with an annular third contact pad 920 corresponding to the alignment mark 51 on a side of the insulating layer 700 away from the first substrate 100. The alignment mark 51 may be a metal structure disposed on the same layer as the first contact pad 940, and the alignment mark 51 may have an exposed portion that is not covered by the planarization layer 280 and the insulation layer 700. The alignment mark 51 may be of a structure such as a metal wire or a buffer metal. The third contact pad 920 and at least a portion of the touch electrode may be disposed in the same layer and made of a same material. That is, the third contact pad 920, the dummy contact pad 910 and the second contact pad 930 may be provided in the same layer and made of the same material. Thus, the third contact pad 920 may be utilized to further protect the alignment mark and alleviate the bonding pressure around it. Since the second region F2 has the alignment mark 51 therein, compared with other positions in the bonding area, during bonding, the insulating layer 700 at the alignment mark is easily broken due to the cooperation of the protrusion on the flexible printed circuit board 800 and the alignment mark 51, and particularly in a case where there is a conductive particle (as shown by dotted lines) at the position, the possibility of breakage of the insulating layer is increased. In this case, if the annular third contact pad 920 corresponding to the alignment mark 51 is provided, the stress applied to the insulating layer 700 by the protrusion or the conductive particle can be buffered by utilizing the good metal ductility of the third contact pad (pad protection structure). It should be particularly noted that "the annular pad protection structure corresponding to the alignment mark 51" specifically means that an orthographic projection of the annular pad protection structure on the substrate 100 corresponds to an orthographic projection of the alignment mark 51 on the substrate 100, that is, the orthographic projection of the annular pad protection structure on the substrate 100 and the orthographic projection of the alignment mark 51 on the substrate 100 are overlapped. For example, an outer edge of the annular third contact pad 920 may have a shape consistent with an outer edge of the alignment mark 51, an orthographic projection of the outer edge of the annular third contact pad 920 on the substrate 100 may be located within the orthographic projection of the alignment mark 51 on the substrate 100, or the orthographic projection of the outer edge of the third contact pad 920 on the substrate 100 may also be located at the periphery of the orthographic projection of the outer edge of the alignment mark 51 on the substrate 100, that is, the outer edge of the third contact pad 920 may surround the outer edge of the alignment mark 51. Certainly, the orthographic projection of the outer edge of the third contact pad 920 on the substrate 100 and the orthographic projection of the alignment mark 51 on the substrate 100 may overlap each other instead of surrounding one another. A position and a shape of an inner edge of the annular third contact pad 920 are not particularly limited, and may be set by those skilled in the art as desired. The annular third contact pad 920 is more favorable for providing a certain accommodation space for a conductive particle that is erroneously provided in the second region F2, so as to further reduce the press to the insulating layer 700 at the position during bonding.

According to some implementations of the present disclosure, the third contact pad 920 at the second region may not be annular, but may have a shape coinciding with the alignment mark 51 (this case is not shown in FIG. 4). In the third region, a second contact pad 930 is provided on a side of the insulating layer 700 away from the first substrate 100, and the second contact pad 930 is located at the first contact pad 940 and does not cover an exposed surface of the first contact pad 940. Thus, the performance of the display panel can be further improved. Similar to the case that the third contact pad 920 is provided in the second region, the second contact pad 930 provided at the first contact pad 940 may also be annular to expose the metal of an upper surface of the contact pad, while the pad protection structure (the second contact pad 930) may also have an outer edge coinciding with the contact pad.

In some implementations of the present disclosure, in a case where the planarization layer 280 covers the edges of the contact pad, the insulating layer 700 may also cover part or all of a surface of the planarization layer away from the substrate in the bonding area, for example, as shown in FIGS. 4 to 6. Specifically, referring to FIG. 6, the orthographic projections of the insulating layer 700 in the second and third regions on the substrate 100 may not overlap with the orthographic projections of the alignment mark 51, the first contact pad 940 and the like on the substrate 100. Therefore, the phenomena of breakage of the insulating layer and the like which may occur when the flexible printed circuit board is bonded can be further alleviated.

According to some implementations of the present disclosure, in a case where the orthographic projection of the planarization layer 280 on the substrate covers the first region, referring to FIG. 5, by disposing the dummy contact pad 910 in the region, the alignment pressure at the region can be alleviated, thereby preventing the insulating layer 700 in the first region from being broken.

The specific structure of the display panel will be described below in detail according to a specific embodiment of the present disclosure.

In the embodiment of the present disclosure, the metal layer forming the contact pad is not particularly limited, and may be selected by those skilled in the art as desired. For example, in the bonding area, referring to FIGS. 9 and 10, a gate metal layer (not shown), a gate insulating layer (such as a first gate insulating layer 210 and a second gate insulating layer 220 shown in the figure), a source-drain metal layer (not shown), and a planarization layer (such as a first planarization layer 250 and a second planarization layer 280) are sequentially stacked on the substrate 100. A first contact pad of the contact pad may be formed of at least one of the gate metal layer or the source-drain metal layer. Specifically, referring to FIG. 9, the metal layer of the first contact pad may be formed of the source-drain metal layer, and specifically, may be formed by a first source-drain metal layer and a second source-drain metal layer, that is, the contact pad may have multiple metal layers, such as a first layer 501 and a second layer 502 shown in the figure. The first layer 501 may be formed by the first source-drain metal layer located between the interlayer insulating layer 230 and a passivation layer 240, the second layer 502 may be formed by the second source-drain metal layer, and the second source-drain metal layer and the first source-drain metal layer are spaced apart by the first planarization layer 280. The first source-drain metal layer and the second source-drain metal layer may also be used for forming a source electrode and a drain electrode of a thin film transistor in the gate driving circuit region in the display area, and a structure such as a wire (such as a data line) connected with the source electrode and the drain electrode. The first source-drain metal layer and the second source-drain metal layer may also extend to the bonding area to form wires in the bonding area and the contact pad described above. Alternatively, according to some implementations of the present disclosure, referring to FIG. 10, the contact pad may also be formed of the gate metal layer and the source-drain metal layer. For example, the gate metal layer may also include a first gate metal layer and a second gate metal layer, the first gate metal layer may be located on a side of the first gate insulating layer 210 facing the substrate 100 (not shown), the second gate metal layer may be located between the first gate insulating layer 210 and the second gate insulating layer 220, and a third layer 503 of the contact pad may be formed of the second gate metal layer. Similarly, the first contact pad may further include a first layer 501 and a second layer 502, the first layer may be formed of the first source-drain metal layer, and the second layer may be formed of the second source-drain metal layer. The first layer 501 and the third layer 503 may be connected by a via hole penetrating an insulating structure, which may include the second gate insulating layer 220, the interlayer insulating layer 230, and the passivation layer 240. The number of the via holes may be one or more, and may be two, three or four, for example.

According to the implementations of the present disclosure, the material forming the first contact pad is not particularly limited, that is, the material forming the gate metal layer and the source-drain metal layer is not particularly limited. The gate metal layer and the source-drain metal layer may be formed of a metal or an alloy, or the gate metal layer and the source-drain metal layer each may also have a plurality of metal sub-layer structures. For example, according to some implementations of the present disclosure, the material forming the gate metal layer and the source-drain metal layer may include a metal material or an alloy material, such as molybdenum, aluminum, titanium, and the like.

According to some implementations of the present disclosure, the contact pad may further include a conductor portion and a lead connection portion. Specifically, the contact pad includes the conductor portion and the lead connection portion that are electrically connected to each other, with a surface of the conductor portion on a side away from the substrate 100 is exposed for bonding with, including but not limited to, the flexible printed circuit board. The lead connection part is connected with the conductor portion at one end, and the other end of the lead connection portion may extend to the peripheral area and is configured for being electrically connected with structures such as the gate driving circuit. According to some implementations of the present disclosure, the lead connection portion and the conductor portion may both be formed of the source-drain metal layer. That is, the lead connection portion and the conductor portion may be formed of the same metal layer through a single patterning process. In a case where the contact pad has a structure formed of multiple layers, such as the first layer 501 and the second layer 502 described above, the lead connection portion and the conductor portion may alternatively be formed of different layers, for example, the lead connection portion may be formed of the first source-drain metal layer used for forming the first layer 501, and the conductor portion may be formed of the first source-drain metal layer and the second source-drain metal layer. Although the first planarization layer 250 is arranged between the first source-drain metal layer and the second source-drain metal layer, the second source-drain metal layer forming the second layer 502 can be in direct contact with the first layer 501 by removing a portion of the first planarization layer 250 contacting the contact pad, and no via hole structure is required. Certainly, the first layer and the second layer may alternatively be electrically connected by first forming a via hole penetrating through the first planarization layer 250 and then forming the second layer 502. Alternatively, according to some implementations of the present disclosure, the lead connection portion may be formed of the gate metal layer, the conductor portion may be formed of the source-drain metal layer, and an insulating structure is provided between the lead connection portion and the conductor portion, and the lead connection portion and the conductor portion are electrically connected to each other through a via hole penetrating through the insulating structure. Thus, the performance of the display panel can be further improved. For example, the insulating structure may be a structure, such as the gate insulating layer (for example, the second gate insulating layer 220, the interlayer insulating layer 230, the passivation layer 240, and the like), located between the gate metal layer and the source-drain metal layer.

Figure 9:
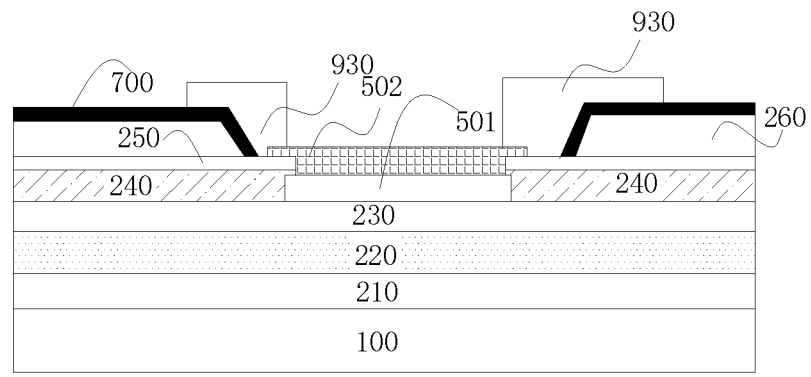
FIG. 9 shows a schematic diagram illustrating a partial structure of a display panel according to an embodiment of the present disclosure.
Figure 10:
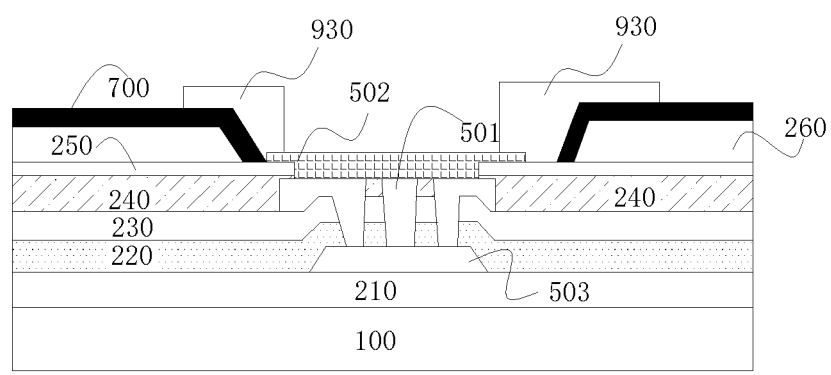
FIG. 10 shows a schematic diagram illustrating a partial structure of a display panel according to an embodiment of the present disclosure.

In some implementations of the present disclosure, as shown in FIG. 9, the first layer 501 is the conductor portion, and the second layer 502 is the lead connection portion; in other implementations, as shown in FIG. 10, the first layer 501 and the second layer 502 are the conductor portion, and the third layer 503 is the lead connection portion.

Figure 11:
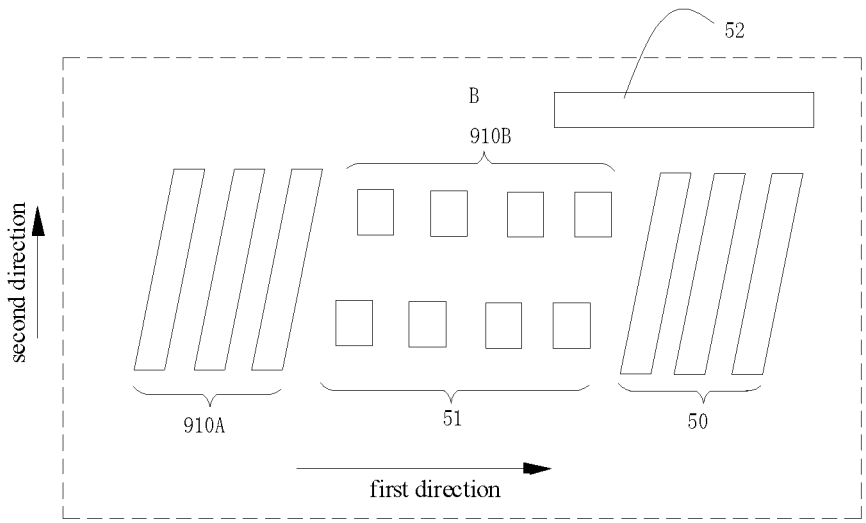
FIG. 11 shows a schematic diagram illustrating a partial structure of a display panel according to an embodiment of the present disclosure.

According to some implementations of the present disclosure, referring to FIG. 11, the dummy contact pad 910 may at least include a first portion 910A. The first portion is located on a side of the contact pad, and the first portion includes a plurality of metal bars. At least a part of a plurality of contact pads 50 forms a first row of contact pads, the first row of contact pads and the first portion are arranged in a row along a first direction, each first contact pad 940 in the first row of contact pads and the metal bars extend along a second direction, and the second direction and the first direction form an included angle therebetween, where the included angle is not specifically limited and may be an acute angle, a right angle or an obtuse angle, and the included angle may be flexibly set by a person skilled in the art as desired. Thereby, the metal bars with the same extension direction in the first portion can better protect the first row of contact pads.

Figure 12:
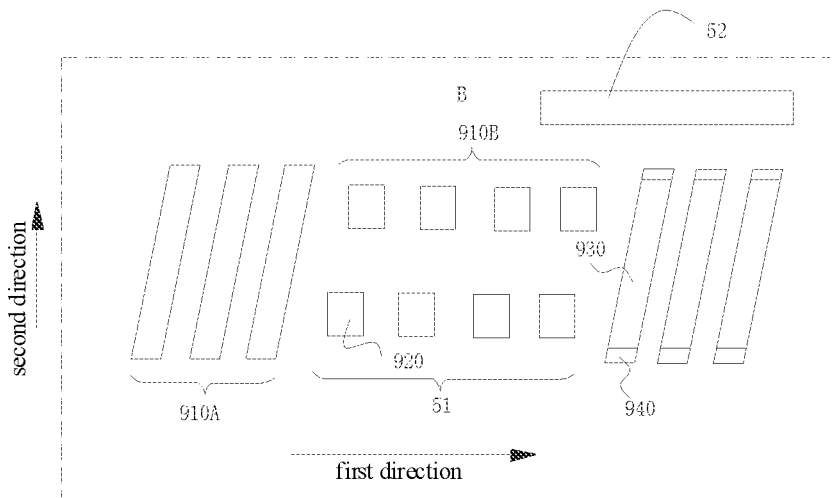
FIG. 12 shows a schematic diagram illustrating a partial structure of a display panel according to an embodiment of the present disclosure.
Figure 13:
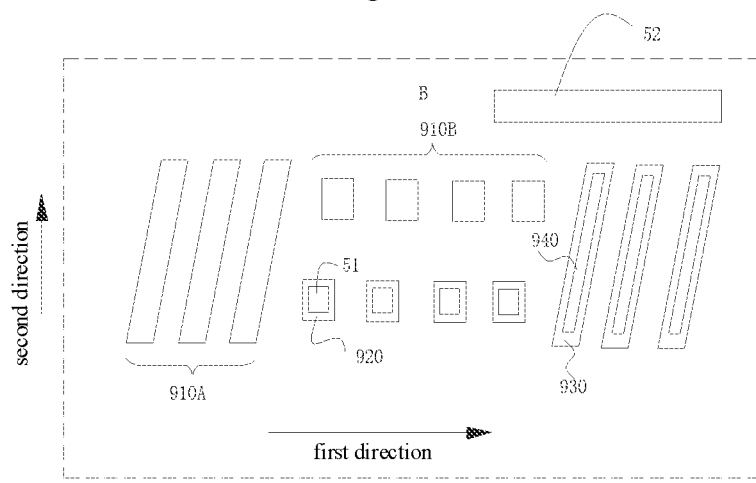
FIG. 13 shows a schematic diagram illustrating a partial structure of a display panel according to an embodiment of the present disclosure.

According to some implementations of the present disclosure, referring to FIGS. 11 and 12, the dummy contact pad 910 may further include a first portion 910A and a second portion 910B, and the first portion and the second portion each may further include a plurality of metal bars or metal blocks. Therefore, the contact pad 50 can be effectively protected, pressure is released, pressing of the conductive particles on the inorganic film layer is reduced, the falling of the film layer is effectively alleviated, and the product yield is improved. That is to say, with the first portion and the second portion formed by metal bars, a relative sunken region can be formed at the position of the contact pad, and can provide more space for accommodating the conductive particle, and can better buffer stress. The first portion 910A may include a plurality of metal bars, the metal bars and the first contact pads 940 being arranged in a row along the first direction, and the metal bars and the first contact pads each extending along the second direction. Each second contact pad 930 may cover a part of a surface of the first contact pad 940 corresponding thereto. The alignment mark 51 may be located between the first portion and the first contact pad, the first contact pad has a length greater than that of the alignment mark in the second direction, the second portion is located between the first portion and the first contact pad and is arranged along the second direction with the alignment mark, and the second contact pad, the third contact pad and the dummy contact pad are all disposed in the same layer as at least a portion of the touch electrode and made of the same material as the at least a portion of the touch electrode. In some implementations, referring to FIG. 13, a third contact pad 920 may be provided at the alignment mark 51, the third contact pad 920 may have an annular structure, and an orthographic projection of the third contact pad 920 on the substrate and an orthographic projection of the alignment mark 51 on the substrate may be overlapped. Specifically, the third contact pad 920 may cover a periphery of the alignment mark 51. Thus, the contact pad 50 can be protected more effectively by the first portion, the second portion, the third contact pad and the alignment mark.

Figure 14:
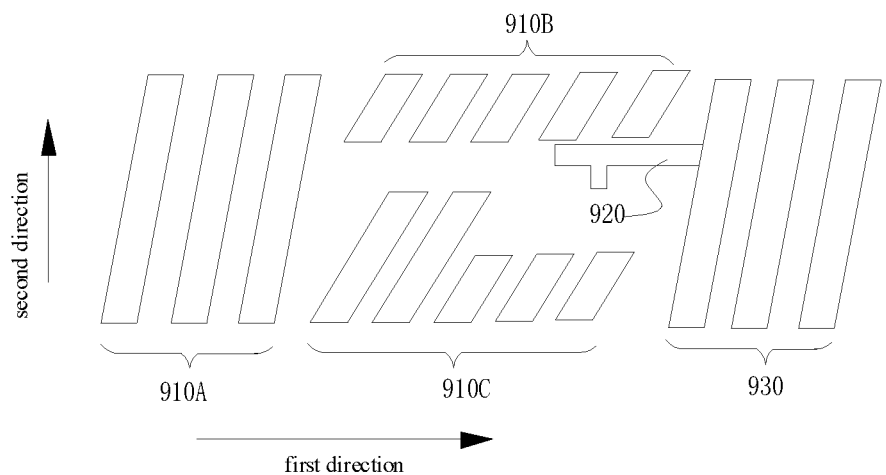
FIG. 14 shows a schematic diagram illustrating a partial structure of a display panel according to an embodiment of the present disclosure.

According to some implementations of the present disclosure, referring to FIG. 14, the alignment mark and the third contact pad 920 disposed corresponding to the alignment mark may be located at a side of the contact pad (e.g., the second contact pad 930 as shown in the figure), and the dummy contact pad may include a first portion 910A, a second portion 910B and a third portion 910C. In particular, the alignment mark and the third contact pad 920 may extend in the first direction, and the contact pad (e.g., the second contact pads 930 shown in the figure) may extend in the second direction. The alignment mark may be adjacent to the contact pad. In this case, the second portion and the third portion may be located between the first portion and the contact pad, and the first portion and the contact pad are arranged to be symmetrical with each other, and the first portion and the contact pad may also have similar lengths and shapes. The second portion and the third portion may be respectively arranged on two sides of the alignment mark in the second direction, so that the pressure can be effectively released, the pressing of the conductive particle on the inorganic film layer is reduced, the falling of the film layer is effectively alleviated, and the product yield is improved.

A touch structure of the display panel will be described in detail below, in some implementations of the present disclosure, referring to FIG. 15, the aforementioned insulating layer 700 may include at least one of a touch buffer sub-layer 610 or a touch insulating sub-layer 630, a touch electrode 650 includes a first electrode layer 620 and a second electrode layer 640, and a touch structure 600 may include the touch buffer sub-layer 610, the first electrode layer 620, the touch insulating sub-layer 630 and the second electrode layer 640, which are sequentially disposed, and the touch buffer sub-layer 610 is close to the light-emitting device. Therefore, the touch structure can be simply formed, and the touch function can be exerted. It should be noted that, the specific shape and the number of the touch electrodes in the touch structure and the specific manner of implementing the touch function are not particularly limited, and the touch structure may implement the touch function by using a mutual-capacitance type or a self-capacitance type inductive capacitor. For example, one of the first electrode layer or the second electrode layer may have a metal mesh structure, and the other of the first electrode layer or the second electrode layer may have a bridge metal connected to the metal mesh through a via hole penetrating through the touch insulating sub-layer 630. In a case where the touch structure implements touch sensing in a mutual-capacitance manner, one of the first electrode layer or the second electrode layer may be a transmitting electrode, and the other of the first electrode layer or the second electrode layer is a receiving electrode. In this case, both the first electrode layer and the second electrode layer may have a hollow-out structure. A material forming the touch electrode is not particularly limited, and may be, for example, a transparent conductive material including, but not limited to, ITO, or may be a metal mesh or a metal block having a small thickness without affecting a display function. The first electrode layer and the second electrode layer may further be provided with a wiring structure connected with the touch electrode so as to drive the touch electrode and transmit a touch signal. The wiring structure may extend from the peripheral area 1300 at both sides of the display area 1200 shown in FIG. 1 to the bonding area 1600.

In an possible implementation, at least one of the touch buffer sub-layer 610 or the touch insulating sub-layer 630 covers an edge portion of the contact pad 50, and a center portion of a surface of the contact pad 50 away from the substrate 100 is exposed. Thus, the contact pad 50 may be easily electrically connected to an external circuit, thereby improving the product performance. According to a specific implementation of the present disclosure, the insulating layer in the bonding area may include at least one of the touch buffer sub-layer 610 or the touch insulating sub-layer 630, for example, include the touch buffer sub-layer 610 and the touch insulating sub-layer 630, as shown in FIG. 7. Therefore, on one hand, the insulating layer of the touch structure can be used for protecting the contact pad in the bonding area to a certain extent, for example, the insulating layer covers the edge portion of the contact pad; on the other hand, a pad protection structure is also convenient to form, for example, the pad protection structure may be formed of the second electrode. Here, the "edge portion" of the contact pad 50 refers to a portion of the contact pad close to the insulating layer 700 (at least one of the touch buffer sub-layer 610 or the touch insulating sub-layer 630). That is, the portion of the contact pad 50 close to the insulating layer 700 is covered by the insulating layer 700.

According to some implementations of the present disclosure, a specific structure of the display panel in the display area is not particularly limited, and a person skilled in the art may design the display panel as desired. For example, referring to FIG. 15, the substrate 100 may include a plurality of structures stacked, such as a first substrate 110, a second substrate 140, a first barrier layer 120, a second barrier layer 150, where the second substrate 140 is disposed on a side of the first substrate 110, the first barrier layer 120 is disposed between the first substrate 110 and the second substrate 140, and the second barrier layer 150 is disposed on a side of the second substrate 140 away from the first barrier layer 120; a backplane circuit structure 200 is located at a side of the substrate 100, and may specifically include an active layer 10, the first gate insulating layer 210, the interlayer insulating layer 230, the second gate insulating layer 220, the passivation layer 240, and the planarization layer 280 (including the first planarization layer 250 and the second planarization layer 260), and the backplane circuit structure 200 may be configured to form a thin film transistor and a capacitor of a pixel region circuit, and may further extend to the peripheral area to form a thin film transistor and a capacitor in a gate driving circuit. For example, a first gate metal may be used to form a gate electrode 30 in the thin film transistor, a gate line (not shown), and one electrode 31 of the capacitor, and a second gate metal may be used to form the other electrode 32 of the capacitor with the second gate insulating layer 220 interposed between the second gate metal and the first gate metal, thereby constituting a capacitor structure. The first source-drain layer may be used to form a source and drain electrodes 21 and 22 of the thin film transistor. As mentioned above, the gate driving circuit may include a plurality of thin film transistors, and similarly, the pixel region circuit may also include a plurality of thin film transistors and a capacitor structure, such as 3T1C structure, 7T1C structure (T represents a thin film transistor, and C represents a capacitor), and so on. In this case, the second source-drain layer may be used to form source and drain electrodes and wires of other thin film transistors, and may be used to form a transfer electrode 40. The transfer electrode 40 may be located between and electrically connected to the drain electrode 21 and an anode 410 of the light-emitting device. A plurality of light-emitting devices may be spaced apart from each other by a pixel defining layer 300 and may share a cathode 430. An encapsulation structure 500 may include a plurality of inorganic sub-layers and an organic sub-layer, which are stacked, for example, specifically include a first inorganic sublayer 510, a second inorganic sublayer 530, and an organic sublayer 520, so as to seal the light-emitting device onto the substrate and prevent moisture and oxygen from invading a moisture-oxygen sensitive structure such as a light emitting layer 420. The touch structure 600 may be located on a side of the encapsulation structure 500 away from the substrate 100, and the touch structure may be fixed to the encapsulation structure by a method including, but not limited to, using an optical adhesive.

In another possible implementation, the display panel may be an SD1 product. That is, the display panel does not include the transfer electrode 40, and thus, the second gate insulating layer 220 may not be disposed in the display panel.

According to some implementations of the present disclosure, the specific materials for forming the various layer structures in the backplane circuit structure are not particularly limited, and can be selected by those skilled in the art as desired. For example, according to some implementations of the present disclosure, the first substrate and the second substrate may be made of an organic material, for example, may be made of a flexible material specifically including one or more of resin-based materials such as polyimide, polycarbonate, polyacrylate, polyetherimide, polyethersulfone, polyethylene terephthalate, and polyethylene naphthalate. That is, the display panel may be a flexible display panel.

Figure 16:
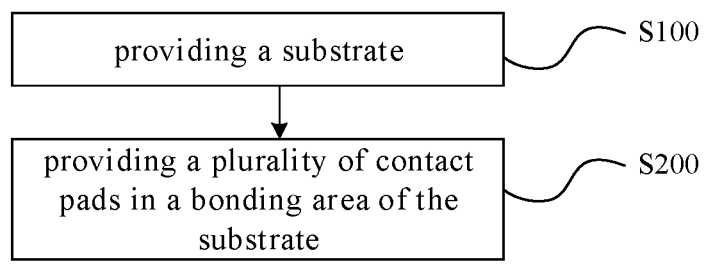
FIG. 16 shows a schematic flowchart of a method for manufacturing a display panel according to an embodiment of the present disclosure.

In another aspect of the present disclosure, the present disclosure further provides a method for manufacturing the aforementioned display panel. Referring to FIG. 16, the method includes steps S100 to S200.

At step S100, providing a substrate.

According to some implementations of the present disclosure, in this step, a substrate is first provided, then a gate driving circuit is formed on the substrate, a light-emitting device is disposed in a display area of the substrate, and a touch structure 600 is disposed on a side of the light-emitting device away from the substrate 100. The specific structure of the above structure in the substrate has been described in detail earlier and will not be repeated herein.

For example, a backplane circuit layer may be formed on the substrate to form a gate driving circuit, a pixel region circuit, and other structures, and various wires may be formed by using metal in the backplane circuit layer. In particular, the desired structure may be formed by depositing an entire layer of material and then performing a patterning process on the entire layer of material. The patterning process may include a dry etching and a wet etching, and material in a partial region of the substrate is removed by using a mask plate, so as to reserve the material in a specific region, thereby forming the aforementioned active layer, source and drain electrodes, gate, capacitor, and other structures, and forming a necessary via hole penetrating through the insulating structure to achieve the electrical connection. The light-emitting device may be located in a region defined by a pixel defining layer, and the light emitting layer may be formed by deposition or ink jet printing. The light-emitting device may further have structures such as an electron transport layer, an electron blocking layer, a hole injection layer, a hole blocking layer, and the like, for improving the performance of the light-emitting device. A touch structure may be fixed on a side of an encapsulation structure away from the substrate by an optical adhesive or the like.

At step S200, providing a plurality of contact pads in a bonding area of the substrate.

According to some implementation of the present disclosure, in this step, the contact pads are arranged in the bonding area of the substrate, the contact pads are configured to be bonded with a flexible printed circuit board, and at least part of each contact pad and at least part of a touch electrode are provided in a same layer and made of a same material. In this way, connection with an external circuit can be facilitated.

The specific structure and composition of the contact pad have been described in detail above, and are not described in detail herein. It should be noted that, as mentioned above, the first contact pad of the contact pad may be formed by at least one of the source-drain metal layer or the gate metal layer, and thus, the contact pad may be formed through the patterning process for a corresponding metal layer in the aforementioned operation of forming the backplane circuit.

It should be noted that, in a case where the contact pad is formed by at least one of the source-drain metal layer or the gate metal layer, the operation of forming the contact pad is performed during the process of forming the backplane circuit structure. Therefore, the above description of steps S100 and S200 in the present disclosure is only for distinguishing the manufacturing operations of different regions, and should not be construed as limiting the sequence of operations.

According to some implementations of the present disclosure, in order to obtain a display panel capable of alleviating or even avoiding the problem of breakage or fracture of the insulating layer in the bonding area, the method further includes at least one of the following steps:

making an orthographic projection of the insulating layer on the substrate and an orthographic projection of the contact pad on the substrate be not overlapped with each other; making a segment difference between a position of the contact pad in the bonding area and a region except the position of the contact pad be not less than 0.5 μm; and arranging a pad protection structure in the bonding area.

Specifically, making the segment difference between a position of the contact pad in the bonding area and a region except the position of the contact pad be not less than 0.5 μm may be achieved by removing a portion of the planarization layer in the bonding area at the periphery of the contact pad. Specifically, the removal of the portion of the planarization layer may be performed when the substrate is provided, and more specifically, the material for forming the planarization layer located at the bonding area may be subjected to an etching process before the light-emitting device is formed.

Similarly, making the orthographic projection of the insulating layer on the substrate and the orthographic projection of the contact pad on the substrate be not overlapped may be implemented as follows: extending, during forming the touch structure, the insulating layer to the bonding area, and then removing a portion of the insulating layer in a partial region, so that the orthographic projection of the insulating layer on the substrate and the orthographic projection of the contact pad on the substrate are not overlapped. Therefore, the breakage and fracture of the insulating layer in the bonding area caused by the damage of the insulating layer due to the bonding pressure and the like at the contact pad in the bonding area to be bonded can be prevented.

At least part of the contact pad and at least part of the touch electrode are provided in the same layer and made of the same material. For example, the second contact pad described above may be made of a material forming the touch electrode. The second contact pad may be provided in synchronization with the formation of the touch electrode. Thus, the display panel can be obtained easily.

The structure of the display panel and the advantages of the structure have been described in detail previously, and are not described again. In general, the display panel obtained by the method may have at least one of the following advantages: at least part of the contact pad and at least part of the touch electrode are arranged in the same layer and made of the same the material, so that pressure can be effectively released, the damage of the structure at the periphery of the contact pad caused by large bonding pressure during the contact pad being connected with an external circuit is prevented, the inorganic film layer of a flexible multilayer structure is protected, the falling of the film layer and the test failure caused by the moisture absorption of the planarization layer due to the breakage of the inorganic film layer can be alleviated and even solved, and the product yield is improved.

For example, according to some implementations of the present disclosure, during forming the touch electrode, the metal layer forming the touch electrode may be extended to the bonding area, and the metal layer may be processed by using a single patterning process to simultaneously form the touch electrode and the second contact pad. Therefore, pressure can be effectively released, pressing of the conductive particle 60 on the inorganic film layer is reduced, the falling of the film layer falling is effectively alleviated, and the product yield is improved.

In yet another aspect of the present disclosure, the present disclosure provides a display apparatus. The display apparatus includes the display panel described above. Therefore, the display apparatus has all the features and advantages of the display panel described above, and the description thereof is omitted. Generally speaking, the display apparatus has at least the advantage of higher product yield.

In the description of the present disclosure, the terms "upper", "lower", and the like indicate orientations or positional relationships based on those shown in the drawings, which are merely for convenience of describing the present disclosure and do not require that the present disclosure must be constructed and operated in a specific orientation, and thus, should not be construed as limiting the present disclosure. The terms "first", "second", and the like are used only to distinguish one element from another and cannot be understood as limitations or implications for quantity or importance.

In the description of the present disclosure, the description of the reference term "an embodiment/implementation", "another embodiment/implementation", or the like, means that a particular feature, structure, material, or characteristics described in connection with the embodiment/implementation is included in at least one embodiment/implementation of the present disclosure. In this specification, the schematic representations of the terms used above are not necessarily intended to refer to the same embodiment/implementation or example. Furthermore, particular features, structures, materials, or characteristics described may be combined in any suitable manner in any one or more embodiments/implementations or examples. Moreover, various embodiments/implementations or examples and features of various embodiments/implementations or examples described in this specification can be combined by one skilled in the art without conflicting with each other. In addition, it should be noted that the terms "first" and "second" in this specification are used for descriptive purposes only and are not to be construed as indicating or implying relative importance or to imply that the number of indicated technical features.

While embodiments of the present disclosure have been shown and described above, it will be understood that, the above embodiments are exemplary and not to be construed as limiting the present disclosure, and that changes, modifications, substitutions and alterations may be made to the above embodiments by those of ordinary skill in the art within the scope of the present disclosure.

What is claimed is:

1. A display panel, comprising:
   a substrate having a display area and a peripheral area located on at least one side of the display area;

a bonding area located on a side of the display area and in the peripheral area, wherein a bending area is arranged between the display area and the bonding area;

a gate driving circuit, which is at least partially located in the peripheral area and is configured to provide a gate driving signal for a light-emitting device in the display area; and a touch structure located on a side of the light-emitting device away from the substrate, the touch structure comprising a touch electrode and an insulating layer, wherein a control chip connecting terminal is arranged in the bonding area at a position close to the bending area, the control chip connecting terminal is electrically connected with the gate driving circuit, a contact pad is arranged on a side of the control chip connecting terminal away from the bending area, and at least a portion of the contact pad and at least a portion of the touch electrode are arranged in a same layer and made of a same material, the second contact pad covers at least an edge of the first contact pad, and the second contact pad has a border region at a portion thereof away from the first contact pad, an orthographic projection of the border region on the substrate and an orthographic projection of the first contact pad on the substrate are not overlapped, and a height difference between the first contact pad and the border region is not less than 0.5 μm, and wherein the display panel further comprises a buffer layer, a gate insulating layer, and an interlayer insulating layer, which are sequentially stacked, in the bonding area, the first contact pad being located on a side of the interlayer insulating layer away from the substrate, the planarization layer being located on the side of the interlayer insulating layer away from the substrate, and an orthographic projection of the planarization layer on the substrate at least overlapping with an orthographic projection of the second contact pad on the substrate, wherein the insulating layer is in contact with the interlayer insulating layer in at least a part of the border region.

2. The display panel according to claim 1, further comprising a dummy contact pad, which is located on at least one side of the contact pad in a plane parallel to the substrate, wherein the dummy contact pad and at least a portion of the touch electrode are provided in a same layer and made of a same material.

3. The display panel according to claim 1, further comprising a gate metal layer, a gate insulating layer, a source-drain metal layer and a planarization layer sequentially stacked on the substrate, the light-emitting device being located on a side of the planarization layer away from the substrate, wherein a part of the contact pad is formed by at least one of the gate metal layer or the source-drain metal layer.

4. The display panel according to claim 3, wherein the contact pad comprises a first contact pad and a second contact pad, the first contact pad being arranged close to the substrate, the second contact pad being located at a side of the first contact pad away from the substrate, and an orthographic projection of the first contact pad on the substrate and an orthographic projection of the second contact pad on the substrate being at least partially overlapped, the first contact pad is formed by at least one of the gate metal layer or the source-drain metal layer, and the second contact pad and at least a portion of the touch electrode are arranged in a same layer and made of a same material.

5. The display panel according to claim 4, wherein the insulating layer is at least partially located in the bonding area and covers a part of the bonding area, and an orthographic projection of the insulating layer on the substrate at least does not overlap with an orthographic projection of the first contact pad on the substrate.

6. The display panel according to claim 4, wherein the planarization layer is partially located in the bonding area, the planarization layer has a first opening at the contact pad to expose the contact pad, the insulating layer covers the planarization layer, and the insulating layer has a second opening at least partially exposing the first opening.

7. The display panel according to claim 1, wherein the insulating layer comprises at least one of a touch buffer sub-layer or a touch insulating sub-layer, the touch electrode comprises a first electrode layer and a second electrode layer, and the touch structure comprises the touch buffer sub-layer, the first electrode layer, the touch insulating sub-layer and the second electrode layer arranged in sequence, and the touch buffer sub-layer is closer to the light-emitting device than the first electrode layer, the touch insulating sub-layer and the second electrode layer.

8. The display panel according to claim 7, further comprising a dummy contact pad located on at least one side of the contact pad, and an alignment mark between the dummy contact pad and the contact pad, wherein orthographic projections of the touch buffer sub-layer and the touch insulating sub-layer on the substrate do not overlap with orthographic projections of the contact pad, the dummy contact pad, and the alignment mark on the substrate.

9. The display panel according to claim 7, wherein at least one of the touch buffer sub-layer or the touch insulating sub-layer covers an edge portion of the contact pad.

10. The display panel according to claim 9, wherein the second contact pad has an annular structure located on a side of the insulating layer away from the substrate, and an outer periphery of the annular structure has a shape consistent with that of the first contact pad.

11. The display panel according to claim 2, wherein the dummy contact pad has at least a first portion, the first portion being located on a side of the contact pad and the first portion comprising a plurality of metal bars.

12. The display panel according to claim 11, wherein the display panel comprises a plurality of contact pads, at least a part of the plurality of contact pads constitute a first row of contact pads, the first row of contact pads and the first portion are arranged in a row along a first direction, first contact pads of the first row of contact pads and the metal bars each extend along a second direction, and the second direction and the first direction forms an included angle therebetween.

13. The display panel according to claim 4, further comprising:

a dummy contact pad located on at least one side of the contact pad;

an alignment mark located between the dummy contact pad and the contact pad;

a third contact pad located on a side of the alignment mark away from the substrate, an orthographic projection of the third contact pad on the substrate and an orthographic projection of the alignment mark on the substrate being overlapped;

the dummy contact pad comprises a first portion and a second portion, the first portion comprising a plurality of metal bars, the metal bars and the first contact pad being arranged in a row along a first direction, and the metal bars and the first contact pad each extending along a second direction, the alignment mark being located between the first portion and the first contact pad, the first contact pad having a length longer than that of the alignment mark in the second direction, and the second portion being located between the first portion and the first contact pad, and the second portion and the alignment mark being arranged along the second direction, wherein the second contact pad, the third contact pad and the dummy contact pad are all arranged in a same layer as at least a portion of the touch electrode and made of a same material as the at least portion of the touch electrode.

14. The display panel according to claim 1, further comprising:
a first substrate;
a second substrate disposed at a side of the first substrate;
a first barrier layer located between the first substrate and the second substrate;
a second barrier layer located on a side, away from the first barrier layer, of the second substrate;
a backplane circuit structure comprising an active layer, a first gate insulating layer, a gate metal layer, a second gate insulating layer, a source-drain metal layer, a passivation layer, a second source-drain metal layer and a planarization layer, the backplane circuit structure forming a thin film transistor and a capacitor in the gate driving circuit, and at least a portion of an orthographic projection of the planarization layer on the first substrate is located in the bonding area;
a pixel defining structure located on a side of the backplane circuit structure away from the first substrate and providing a plurality of openings in the display area for accommodating organic light-emitting devices; and
an encapsulation structure comprising inorganic sub-layers and organic sub-layers stacked together, the encapsulation structure being located on a side of the pixel defining structure away from the first substrate and encapsulating the organic light-emitting devices onto the substrate;
wherein the touch structure comprises a touch buffer sub-layer, a first electrode layer, a touch insulating sub-layer and a second electrode layer which are sequentially arranged, and the touch structure is located on a side, away from the organic light-emitting device, of the encapsulating structure;
a dummy contact pad is further provided on at least one side of the contact pad, an alignment mark is arranged between the dummy contact pad and the contact pad, a third contact pad is provided at a side of the alignment mark away from the substrate, an orthographic projection of the third contact pad on the substrate and an orthographic projection of the alignment mark on the substrate are overlapped, the contact pad comprises a first contact pad and a second contact pad, the first contact pad is arranged close to the substrate, and the second contact pad, the third contact pad and the dummy contact pad are all arranged in a same layer and made of a same material as the second electrode layer, and the bonding area has a plurality of predetermined regions comprising a first region, a second region and a third region, the contact pad is located in the third region, the alignment mark is located in the second region, and the dummy contact pad is located in the first region.

15. The display panel according to claim 14, wherein orthographic projections of the planarization layer, the touch buffer sub-layer, and the touch insulating sub-layer on the first substrate at least partially cover the first region, the second region, and the third region and cover an edge of the first contact pad;
the dummy contact pad in the first region is located on a side of the touch insulating sub-layer away from the substrate;
the second region is provided therein with the third contact pad corresponding to the alignment mark, and the third contact pad is located on a side, away from the first substrate, of the touch insulating sub-layer; and
the third region is provided therein with a second contact pad on a side of the touch insulating sub-layer away from the first substrate, and an orthographic projection of the second contact pad on the substrate covers an orthographic projection of the first contact pad on the substrate.

16. The display panel according to claim 14, wherein an orthographic projection of the planarization layer on the first substrate and the first region are not overlapped, and the first region is provided therein with the touch buffer sub-layer and the touch insulating sub-layer;
the planarization layer covers an edge of the alignment mark and an edge of the first contact pad, and the touch buffer sub-layer and the touch insulating sub-layer are further provided on a side of the planarization layer away from the first substrate in the second region and the third region; and
the third contact pad and the second contact pad both cover a part of the touch insulating sub-layer.

17. The display panel according to claim 1, wherein the contact pad comprises a lead connection portion and a conductor portion which are electrically connected to each other, a surface of the conductor portion at a side away from the substrate being exposed, and
the lead connection portion and the conductor part are both formed by a source-drain metal layer, or the lead connection portion is formed by a gate metal layer, the conductor portion is formed by a source-drain metal layer, an insulating structure is arranged between the lead connection portion and the conductor portion, and the lead connection portion and the conductor portion are electrically connected to each other through a via hole penetrating through the insulating structure.

18. A display apparatus, comprising the display panel according to claim 1.

* * * * *